(12) United States Patent
Kruger et al.

(10) Patent No.: US 6,473,480 B1
(45) Date of Patent: Oct. 29, 2002

(54) METHOD AND APPARATUS FOR MAINTAINING PROPER NOBLE METAL LOADING FOR A NOBLE METAL APPLICATION PROCESS FOR WATER-COOLED NUCLEAR REACTORS

(75) Inventors: Richard M. Kruger, Fremont, CA (US); Robert J. Law, Livermore, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/734,039

(22) Filed: Dec. 12, 2000

Related U.S. Application Data

(60) Provisional application No. 60/173,562, filed on Dec. 30, 1999.

(51) Int. Cl.[7] .................................................. G21C 9/00
(52) U.S. Cl. ...................... 376/260; 376/305; 376/306; 702/23
(58) Field of Search ................................ 376/305, 306; 702/23; 700/266

(56) References Cited

U.S. PATENT DOCUMENTS

| | | | | |
|---|---|---|---|---|
| 5,135,709 A | * | 8/1992 | Andresen et al. | 376/305 |
| 5,392,325 A | * | 2/1995 | Gordon et al. | 376/301 |
| 5,579,354 A | * | 11/1996 | Sakai et al. | 376/245 |
| 5,600,691 A | | 2/1997 | Hettiarachchi et al. | 376/305 |
| 5,600,692 A | * | 2/1997 | Hettiarachchi | 376/305 |
| 5,625,656 A | * | 4/1997 | Hettiarachchi et al. | 376/245 |
| 5,696,696 A | * | 12/1997 | Gunther et al. | 700/266 |
| 5,719,911 A | * | 2/1998 | Hettiarachchi et al. | 204/404 |
| 5,805,653 A | * | 9/1998 | Hettiarachchi et al. | 376/305 |
| 5,818,893 A | | 10/1998 | Hettiarachchi | 376/305 |
| 5,904,991 A | * | 5/1999 | Hettiarachchi | 376/305 |
| 5,914,875 A | * | 6/1999 | Monta et al. | 376/245 |
| 5,991,352 A | * | 11/1999 | Taylor | 376/260 |

FOREIGN PATENT DOCUMENTS

EP          0094884      * 11/1983  .................. 376/306

OTHER PUBLICATIONS

S. Hettiarachchi et al., "The First In–Plant Demonstration of NMCA Technology for IGSCC Mitigation of BWR Internals", 1997, Proceedings of the Int. Symposium on Env. Degradation of Materials in Nuclear Pwr. Systems–Water Reactors, pp. 535–542.*

Cowan, R. L., et al., "Experience with Noble Metal Chemical addition in BWRs", Apr. 2001, VGB Power Tech, pp. 81–86.*

(List continued on next page.)

*Primary Examiner*—Charles T. Jordan
*Assistant Examiner*—Daniel Matz
(74) *Attorney, Agent, or Firm*—Nixon & Vanderhye P.C.

(57) ABSTRACT

A non-steady state computer model of water in a Boiling Water Reactor (BWR) primary water flow circuit is used to represent the water chemistry and noble metal loading during, for example, an in situ noble metal application process. The modeling software is provided on a laptop or portable computer for real-time use in the field at different reactor sites. After inputting data representing the initial state of reactor water chemistry and operating conditions of the reactor, the model determines the water chemistry, pH, conductivity and noble metal loading throughout the BWR primary water flow circuit, including selected sample locations, as a function of time. Results are used to determine whether technical specifications on conductivity or other chemistry-related parameters will be exceeded during the noble metal application process. Values of rate constants used for modeling noble metal reactions may be changed on site at the reactor during the application process.

6 Claims, 9 Drawing Sheets

OTHER PUBLICATIONS

Yeh, Tsung–Kuang and Chu, Fang, "ECP Modeling in the PHTC of the Chinshan BWR Under the Condition of HWC and Noble Metal coating", (Dec. 2000), Journal of Nuclear Science and Technology, vol. 37, No. 12, pp. 1063–1074.*

Yeh, Tsung–Kuang et al., "The Predicted Effectiveness of Noble Metal Treatment at the Chinshan BWR", (Aug. 1999), $9^{th}$ International Symposium of Env. Degradation of Material in Nuclear Power Systems–Water Reactors, pp. 1211–1224.*

* cited by examiner

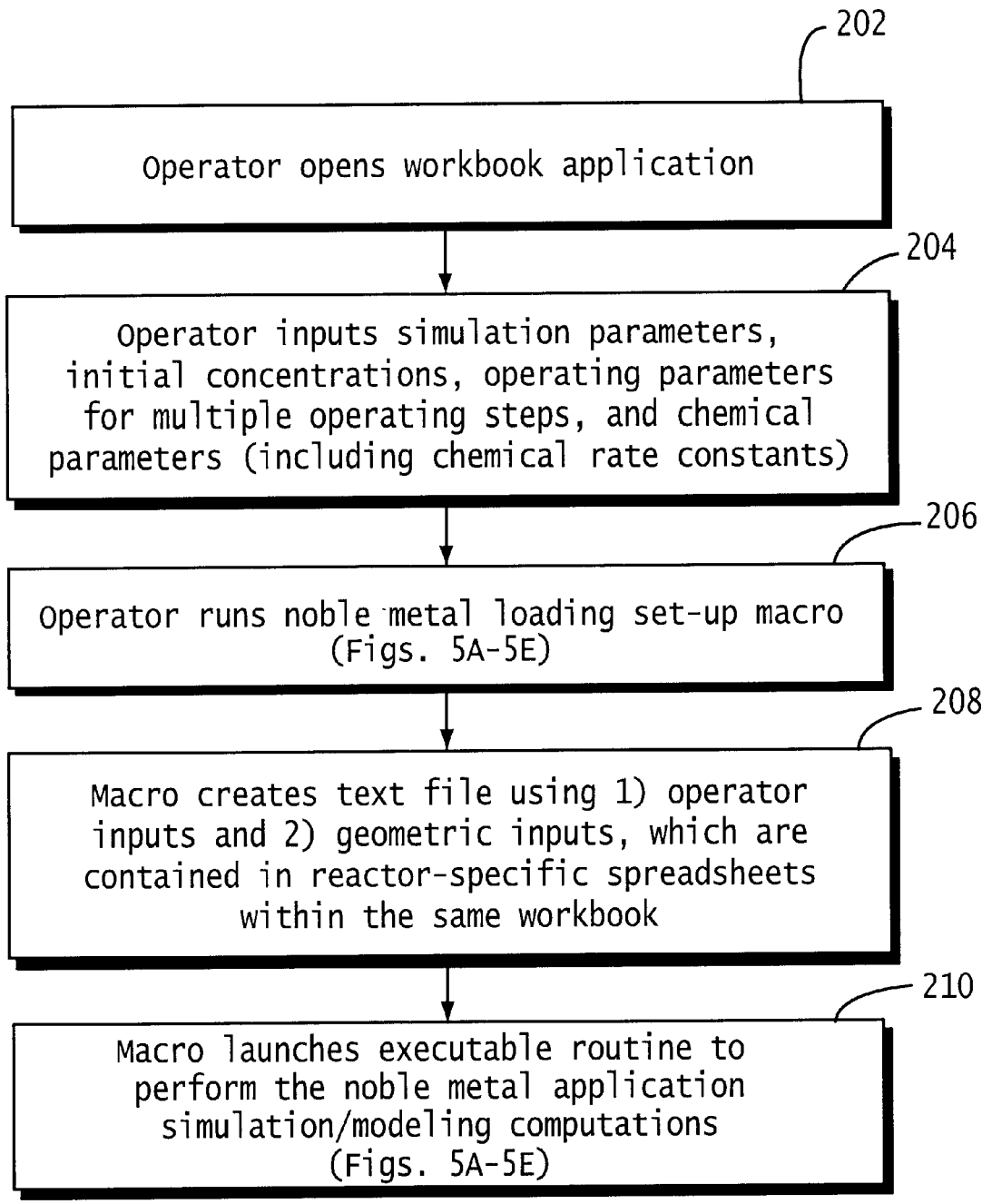

METHOD AND APPARATUS FOR MAINTAINING PROPER NOBLE METAL LOADING FOR A NOBLE METAL APPLICATION PROCESS FOR WATER-COOLED NUCLEAR REACTORS

CROSS-REFERENCE TO RELATED APPLICATIONS

This application claims the benefit of U.S. Provisional Application serial No. 60/173,562, filed Dec. 30, 1999, the entire content of which is incorporated by reference into this application.

TECHNICAL FIELD OF THE INVENTION

This invention relates generally to reducing the corrosion potential of components exposed to high-temperature water through a noble metal application process. More specifically, the invention relates to a method and apparatus for modeling and maintaining the amount of noble metals deposited in the water circuit of a boiling water reactor and components thereof during an in situ noble metal application process.

BACKGROUND OF THE INVENTION

Nuclear reactors are used in electric power generation, research and propulsion. A reactor pressure vessel contains the reactor coolant, i.e. water, which removes heat from the nuclear core. Respective piping circuits carry the heated water or steam to the steam generators or turbines and carry circulated water or feedwater back to the vessel. Operating pressures and temperatures for the reactor pressure vessel are about 7 MPa and 288EC for a boiling water reactor (BWR), and about 15 MPa and 320EC for a pressurized water reactor (PWR). The materials used in both BWRs and PWRs must withstand various loading, environmental and radiation conditions.

Some of the materials exposed to high-temperature water include carbon steel, alloy steel, stainless steel, nickel-based, cobalt-based and zirconium-based alloys. Despite careful selection and treatment of these materials for use in water reactors, corrosion occurs in the materials exposed to the high-temperature water. Such corrosion contributes to a variety of problems, e.g., stress corrosion cracking, crevice corrosion, erosion corrosion, sticking of pressure relief valves and buildup of the gamma radiation-emitting Co-60 isotope.

Stress corrosion cracking (SCC) is a known phenomenon occurring in reactor components, such as structural members, piping, fasteners and welds exposed to high-temperature water. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC.

It is well known that SCC occurs at higher rates when oxygen is present in the reactor water in concentrations of about 5 ppb or greater. SCC is further increased in a high radiation flux where oxidizing species, such as oxygen, hydrogen peroxide, and short-lived radicals, are produced from radiolytic decomposition of the reactor water. Such oxidizing species increase the electrochemical corrosion potential (ECP) of metals. Electrochemical corrosion is caused by a flow of electrons from anodic to cathodic areas on metallic surfaces. The ECP is a measure of the thermodynamic tendency for corrosion phenomena to occur, and is a fundamental parameter in determining rates of, e.g., SCC, corrosion fatigue, corrosion film thickening, and general corrosion.

In a BWR, the radiolysis of the primary water coolant in the reactor core causes the net decomposition of a small fraction of the water to the chemical products $H_2$, $H_2O_2$, $O_2$ and oxidizing and reducing radicals. For steady-state operating conditions, equilibrium concentrations of $O_2$, $H_2O_2$, and $H_2$ are established in both the water which is recirculated and the steam going to the turbine. This concentration of $O_2$, $H_2O_2$, and $H_2$ is oxidizing and results in conditions that can promote intergranular stress corrosion cracking (IGSCC) of susceptible materials of construction. One method employed to mitigate IGSCC of susceptible material is the application of hydrogen water chemistry (HWC), whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species to reform water, thereby lowering the concentration of dissolved oxidizing species in the water in the vicinity of metal surfaces. The rate of these recombination reactions is dependent on local radiation fields, water flow rates and other variables.

The injected hydrogen reduces the level of oxidizing species in the water, such as dissolved oxygen, and as a result lowers the ECP of metals in the water. However, factors such as variations in water flow rates and the time or intensity of exposure to neutron or gamma radiation result in the production of oxidizing species at different levels in different reactors. Thus, varying amounts of hydrogen have been required to reduce the level of oxidizing species sufficiently to maintain the ECP below a critical potential required for protection from IGSCC in high-temperature water. As used herein, the term "critical potential" means a corrosion potential at or below a range of values of about −0.230 to −0.300 V based on the standard hydrogen electrode (SHE) scale. IGSCC proceeds at an accelerated rate in systems in which the ECP is above the critical potential, and at a substantially lower or zero rate in systems in which the ECP is below the critical potential. Water containing oxidizing species such as oxygen increases the ECP of metals exposed to the water above the critical potential, whereas water with little or no oxidizing species presents results in an ECP below the critical potential.

Corrosion potentials of stainless steels in contact with reactor water containing oxidizing species can be reduced below the critical potential by injection of hydrogen into the water so that the dissolved hydrogen concentration is about 50 to 100 ppb or greater. For adequate feedwater hydrogen addition rates, conditions necessary to inhibit IGSCC can be established in certain locations of the reactor. Different locations in the reactor system require different levels of hydrogen addition. For example, much higher hydrogen injection levels are necessary to reduce the ECP within the high radiation flux of the reactor core, or when oxidizing cationic impurities, e.g., cupric ion, are present.

An effective step toward to achieving the goal of reducing ECP within the high radiation flux of the reactor core is to either coat or alloy the stainless steel surface with palladium or any other noble group metal. As used herein, the term "noble metal" means metals from the group consisting of platinum, palladium, osmium, ruthenium, iridium, rhodium, and mixtures thereof. The presence of palladium or other noble metal on the stainless steel surface catalyzes the recombination of oxidizing and reducing species in contact with the surface and reduces the injected hydrogen demand in achieving the required IGSCC critical potential of −0.230 V(SHE). Known techniques for palladium coating include electroplating, electroless plating, plasma deposition and related high-vacuum techniques. Palladium alloying can also be carried out using standard alloy preparation techniques. Unfortunately, both of these approaches are ex situ techniques in that they cannot be practiced while the reactor is in operation.

U.S. Pat. No. 5,135,709 to Andresen et al. discloses a method for lowering the ECP on components formed from carbon steel, alloy steel, stainless steel, nickel-based alloys or cobalt-based alloys which are exposed to high-temperature water by forming the component to have a catalytic layer of a platinum group metal. As used therein, the term "catalytic layer" means a coating on a substrate, or a solute in an alloy formed into the substrate, the coating or solute being sufficient to catalyze the recombination of oxidizing and reducing species at the surface of the substrate.

In nuclear reactors, ECP is increased by the high levels of oxidizing species, e.g., up to 200 ppb or greater of oxygen in the water measured in the circulation piping, produced from the radiolytic decomposition of water in the core of the nuclear reactor. The method disclosed in U.S. Pat. No. 5,135,709 further comprises providing a reducing species in the high-temperature water that can combine with the oxidizing species. In accordance with this known method, high concentrations of hydrogen, i.e., about 100 ppb or more, must be added to the water to provide adequate protection to materials outside the reactor core region, and still higher concentrations are needed to afford protection to materials in the reactor core.

The formation of a catalytic layer of a platinum group metal on an alloy from the aforementioned group catalyzes the recombination of reducing species, such as hydrogen, with oxidizing species, such as oxygen or hydrogen peroxide, that are present in the water of a BWR. Such catalytic action at the surface of the alloy can lower the ECP of the alloy below the critical potential where IGSCC is minimized. As a result, the efficacy of hydrogen additions to high-temperature water in lowering the ECP of components made from the alloy and exposed to the injected water is increased many-fold. Furthermore, it is possible to provide catalytic activity at metal alloy surfaces if the metal substrate of such surfaces contains a catalytic layer of a platinum group metal. Relatively small amounts of the platinum group metal are sufficient to provide the catalytic layer and catalytic activity at the surface of the metal substrate.

Thus, lower amounts of reducing species such as hydrogen are effective in reducing the ECP of the metal components below the critical potential, because the efficiency of recombination of oxidizing and reducing species is increased many-fold by the catalytic layer. Reducing species that can combine with the oxidizing species in the high-temperature water are provided by conventional means known in the art. In particular, reducing species such as hydrogen, ammonia, or hydrazine are injected into the feedwater of the nuclear reactor. However, a need still exists to provide for improved control over the deposition of platinum, palladium or other catalytic metals onto the surface of components in situ. The present invention seeks to satisfy that need.

In this regard, it has been discovered that it is possible to control the amount of metal species deposited on metal surfaces by carefully controlling the water temperature into which the metal is introduced within a particular temperature range. It has also been discovered, that by careful selection of the water temperature, metal concentration and time, it is possible to control the deposit ratio of a particular metal from a mixture of metals.

In addition, it has been found that an unexpectedly increased loading of the deposited metal occurs when the temperature of the water is selected to be within the range of about 200° F. to 550° F., more particularly within the range of about 300° F. to about 450° F., as compared to the loading obtained at temperatures above or below that range. This allows for the selection of a particular metal loading on the metal surface by a careful selection of the appropriate water temperature into which the compound containing the metal species to be deposited is introduced. The deposited metal is typically a noble metal and is introduced in the absence of hydrogen or other added reducing agents.

Moreover, the above described process may be carried out in the presence of hydrogen and other reducing agents. For example, commonly assigned with the present invention, U.S. Pat. Nos. 5,600,691 and 5,818,893 teach an in situ noble metal application process, forming the basis of what is generically referred to herein as the NobleChem™ process, whereby palladium or other catalytic metals are deposited onto stainless steel or other metal surfaces immersed in high-temperature water such that the catalytic metal penetrates into existing cracks in the metal surfaces. During this NobleChem™ process, noble or other catalytic metals are added to the water coolant in the reactor core as a metal-containing compound that is introduced in an amount such that, upon decomposition of the metal-containing compound in the water, the metal atoms are released in an amount sufficient, when present on the metal surface, to reduce the electrochemical corrosion potential of the metal to a level below the critical potential, and thereby protect against intergranular stress corrosion cracking.

Basically, the NobleChem™ process provides a method for reducing corrosion of alloy components such as stainless steel components, in a water-cooled nuclear reactor or associated components, wherein a solution of a compound containing a noble metal (or other catalytic metals) is injected into the reactor water at a temperature of about to 200° to 550° F., for example about 300° to 450° F., in an amount such that, upon decomposition of the compound under the operating reactor thermal conditions, atoms of the metal compound are released at a rate such that the concentration of the metal in the water is sufficient, once incorporated on the alloy components, to reduce the electrochemical corrosion potential of the alloy components to a level below the critical potential. Hydrogen may be present at low levels, for example, preferably less than 400 ppb but acceptably about 300–600 ppb. In this way, the alloy reactor components are protected against intergranular stress corrosion cracking.

The above described NobleChem™ process is based on the discovery that it is possible to control the amount of metals deposited on an oxidized metal surface in high temperature water, as well as the ratio of metal deposit from a mixture of metals, by careful choice of the temperature of the water, concentration of the metal and time. Generally, the preferred noble metals used for the NobleChem™ process are incorporated into a compound containing platinum and rhodium. For example, with a platinum/rhodium mixture, the weight ratio within the temperature range of 200° F.–550° F. is typically from about 5:1 to about 40:1 platinum:rhodium. The compound has the property that it decomposes in the high-temperature water to release atoms of the metal which incorporate in the oxide film at a particular loading level.

Compounds of the platinum group metals are preferred. The term "a platinum group metal", as used herein, means platinum, palladium, osmium, ruthenium, iridium, rhodium and mixtures thereof. It is also possible to use compounds of non-platinum group metals, such as for example zinc, titanium, zirconium, niobium, tantalum, tungsten and vanadium. Mixtures of platinum group compounds may also be used. Mixtures of platinum group compounds and non-platinum group compounds may also be used in combination, for example platinum and zinc. The compounds may be organo-metallic, organic or inorganic and may be soluble or insoluble in water (i.e. may form solutions or suspensions in water and/or other media such alcohols and/or acids). Generally, when mixtures of platinum and non-platinum group metals are used, the platinum group metal is in excess of the other metal.

Examples of preferred platinum group metal compounds which may be used and examples of mixtures of the compounds which may be used are discussed in greater detail in the above mentioned patents. Use of such mixtures results in the incorporation of various noble metals in the oxidized stainless steel surfaces within the reactor.

The noble metal-containing compound is injected in situ into the high-temperature water of a BWR (or PWR) in an amount such as to produce, upon decomposition of the compound, a metal concentration of up to 2000 ppb, for example about 1 to 850 ppb, more usually 5 to 100 ppb. The high temperatures as well as the gamma and neutron radiation in the reactor core act to decompose the compound, thereby freeing noble metal ions/atoms for deposition on the surface of the oxide film. (As used herein, the term "atoms" means atoms or ions).

The noble metal injection solution may be prepared for example by dissolving the noble metal compound in ethanol. The ethanol solution is then diluted with water. Alternatively, a water-based suspension can be formed, without using ethanol, by mixing the noble metal compound in water.

The noble metal either deposits or is incorporated into the stainless steel oxide film via a thermal decomposition process of the noble metal compound. As a result of that decomposition, noble metal ions/atoms become available to replace atoms, e.g., iron atoms, in the oxide film, thereby producing a noble metal-doped oxide film on stainless steel.

The noble metal-containing compound may be injected directly into the water of the reactor in situ in the form of an aqueous solution or suspension, or may be dissolved in the water before it is introduced to the reactor. For the sake of this discussion, the term "solution" means solution or suspension. Such solutions and suspensions may be formed using media well known to those skilled in the art. Examples of suitable media in which solutions and/or suspensions are formed, are water, alkanols such as ethanol, propanol, n-butanol, and acids such as lower carboxylic acids, e.g. acetic acid, propionic acid and butyric acid.

U.S. Pat. No. 5,818,893, entitled "In-Situ Palladium Doping Or Coating Of Stainless Steel Surfaces", which is commonly assigned with the present invention and incorporated herein by reference, discusses the effect of variation of temperature on metal deposit loading rate in greater detail, as well as the effect of distance from the point of introduction of the compound to the region of deposit on the metal surface. As demonstrated in that patent, an enhanced loading is observed over the temperature range of 200° to 500° F., more especially in the range of 300° to 450° F., and particularly at about 340° to 360° F. The loading observed in the temperature range of 300 to 450° F. extends from about 10 $\mu g/cm^2$ at about 300° F. to a maximum of about 62 $\mu g/cm^2$ at about 340° F., and then drops off to about 10 $\mu g/cm^2$ and lower as the temperature rises towards 500° F. This peaking effect is surprising and affords the advantage that loading of the metal species on the metal surface can be controlled by careful selection of the water temperature and point of introduction of the metal to be deposited.

When the metal compound solution or suspension enters the high-temperature water, the compound decomposes very rapidly to produce atoms, which are incorporated into the metal (typically stainless steel) oxide film. In accordance with the above described process, only the solution or suspension of the compound is introduced into the high-temperature water initially. No further agents, such as hydrogen, other reducing agents, acids or bases are introduced into the high-temperature water when the compound solution or suspension is injected into and decomposes in the high-temperature water.

The presence of rhodium renders the deposit more durable. However, it was found that as the temperature of water in the reactor reaches 300° to 500° F., the ratio of deposited platinum to rhodium drops to within the range of about 5:1 to 10:1. Thus, knowing this relationship, it is possible to control the ratio of platinum to rhodium in the deposited layer based on the prevailing temperature conditions of the water. In addition, the deposition rate for a 60 ppb platinum and 20 ppb rhodium solution is a negative exponential with temperature in the 180 to 350° F. range. Thus, it is possible to predict the effect of temperature on the ratio of deposit of the metals and the time required to deposit a given quantity of noble metal in the oxide. Accordingly, the bulk concentration of platinum and rhodium, time and temperature are all controllable variables that may be used to produce a desired platinum-to-rhodium deposit ratio and a desired total noble metal loading.

The noble metal-containing compound solution or suspension may be injected into the high-temperature water while the reactor is operating and generating nuclear heat (full power operation), or during cool down, during outage, during heat-up, during hot standby, or during low power operation. Preferably, the noble metal is introduced into residual heat removal (RHR) piping, recirculation piping, feedwater line, core delta P line, jet pump instrumentation line, control rod drive cooling water lines, water level control points, or any other location which provides introduction of the noble metal into the reactor water and good mixing with the water. As used herein, the term "high-temperature water" in the present invention means water having a temperature of about 200° F. or greater, steam, or the condensate thereof. High temperature water can be found in a variety of known apparatus, such as water deaerators, nuclear reactors, and steam-driven power plants. The temperature of the water when noble metal is added to the reactor water is typically in the range of 200–500° F., for example 200–450° F., more usually about 340°–360° F. When the noble metal-containing compound is in the high-temperature water, it decomposes very rapidly and the metal atoms are incorporated in the oxide surface.

Preferably, only very dilute compound solution or suspension is injected into the high-temperature water. No reducing agents (including hydrogen), acids and bases, are added. As a result, the typical pH of the water at ambient temperature is in the region of 6.5 to 7.5, and at higher operating temperatures is lower, generally in the region of about 5.5–5.8, for example 5.65. (This is due to increased dissociation of the water at the higher temperatures.) In addition, an operating BWR has very stringent coolant water conductivity levels which must be observed. Typically, the conductivity of the coolant water must not exceed 0.3 FS/cm, and more usually must be less than 0.1 FS/cm. Such conductivity levels are adversely impacted by high concentrations of ionic species, and effort is made in the NobleChem™ to ensure that reactor ionic concentrations are maintained as low as possible after clean-up, preferably less than 5 ppb. For example, the process in particular excludes the use of chloride ion in view of its corrosive nature.

While not being bound by theory, it is understood that the metal, for example platinum and/rhodium, is incorporated into the stainless steel oxide film via a thermal decomposition process of the compound wherein metal ions/atoms apparently replace iron, nickel and/or chromium atoms in the oxide film, resulting in a metal-doped oxide film. The metal, such as platinum/rhodium, may for example be incorporated within or on the surface of the oxide film and may be in the form of a finely divided metal. The oxide film is believed to include mixed nickel, iron and chromium oxides.

Following injection and incorporation of the metal(s) in the oxidized stainless steel surfaces, the water is subjected to a conventional clean-up process to remove ionic materials such as nitrate ions present in the water. This clean-up process is usually carried out by passing a fraction of the water removed from the bottom head of the reactor and recirculation piping through an ion exchange resin bed, and the treated water is then returned to the reactor via the feedwater system. Hydrogen may subsequently be introduced into the water some time after the doping reaction, for example 1 to 72 hours after injection and incorporation of the metal atoms in the oxidized surface, to catalyze recombination of hydrogen and oxygen on the metal doped surfaces. As hydrogen is added, the potential of the metal-doped oxide film on the stainless steel components is reduced to values which are, much more negative than when hydrogen is injected into a BWR having stainless steel components which are not doped with the noble metal.

The NobleChem™ process, as basically and briefly outlined above, offers the advantage that steel surfaces within a water-cooled reactor can be doped with noble metal using an in situ technique (i.e., while the reactor is operating) that is simple in application and also inexpensive. Moreover, the process can also be applied to both operating BWRs and PWRs. However, during the NobleChem™ process or any similar in situ metal deposition process, it is necessary to make certain informed decisions concerning how and when to modify various reactor operating conditions—such as water temperature and noble metal-containing compound injection rate—to maintain proper metal loading throughout the deposition process.

Conventionally, the only way to obtain information on the state of a dynamic fluid system has been to perform simple non-steady state mass balances on the fluid within the system. Unfortunately, the procuring of a simple mass balance has proved inadequate for accurately assessing the state of metal deposition and controlling metal loading during in situ reactor deposition processes such as the above described NobleChem™ process—due at least in part to the non-uniformity of metal deposition that typically occurs throughout the water flow circuit in a reactor in addition to other logistical factors inherent to the in situ process and environment as a whole.

BRIEF SUMMARY OF THE INVENTION

The present invention relates to both a method and system for modeling and maintaining the amount of noble metals deposited in the water flow circuit of a boiling water reactor during an in situ noble metal application process, such as the NobleChem™ process described above. A non-steady state computer model of the water in a Boiling Water Reactor (BWR) primary water flow circuit, and other piping directly connected to it, is used to represent the water chemistry and the noble metal loading that occurs before, during and after the noble metal application process. The modeling program tracks the noble metal application process via computed simulation based on reactor conditions and water samples (also called "coupons") taken, for example, at various locations throughout the flow circuit every few hours or so. Such testing of the flow circuit water may be performed during the metal application process while the reactor is operating, for example, in a "hot standby" mode.

In an example embodiment of the present invention, a software system for modeling water in a BWR is provided as an application/utility for use on a computer system having an associated display device and/or other output device for producing graphs and charts (e.g., a PDA, laptop, etc.). The software program code for the noble metal deposition modeling method of the present invention may be embodied in any computer-readable medium for loading and executing on a computer system. Preferably, the modeling software of the present invention is provided on a laptop or portable computer to enhance its transportability for use at different reactor sites. An Exel™ spreadsheet program is used to create a workbook of spreadsheets containing power plant system data for modeling reactor water circuit flow that include geometric configuration data, pertinent operational parameters, simulation parameters, chemical parameters and initial water chemistry data. Alternatively, a portable electronic digital communications device having access via a wireless or landline digital communications link such as, for example, the Internet to a remote computer that performs the noble metal deposition modeling as described herein is also contemplated by the present invention.

The following description is directed toward a presently preferred embodiment of the present invention, which may be operative as an end-user application running, for example, under the Microsoft® Windows 95/NT environment. The present invention, however, is not limited to any particular computer system or any particular environment. Instead, those skilled in the art will find that the system and methods of the present invention may be implemented using almost any contemporary conventional personal or desktop computer system or computer network. Moreover, the invention may be embodied on a variety of different platforms, including UNIX, LINUX, Macintosh, Next Step, Open VMS, and the like. Therefore, the description of the exemplary embodiments which follows is for purposes of illustration and not limitation.

Information and system data characterizing a particular reactor plant may be placed, for example, on a magnetic disk (or other portable storage device) in the form of comma delimited text files. After the data representing the initial state of the reactor water chemistry and initial operating conditions of the reactor is read and input into the appropriate spreadsheet file, the modeling software determines the water chemistry, pH, conductivity and noble metal loading through the BWR primary water flow circuit, including selected sampling locations, as a function of time. The results are saved in files and displayed as charts or graphs for ascertaining whether technical specifications on conductivity or other water chemistry-related parameters will be exceeded during the noble metal application process.

In addition, the values of rate constants used for modeling the noble metal reactions can be changed on site at the reactor during an ongoing in situ application process and the modeling routine re-run until the numerical results from the computer model become consistent with actual measured concentrations of noble metals at selected sample locations. In this manner, a "best estimate" of the noble metal loading occurring within the BWR water flow circuit is obtained and the operating conditions of the reactor can then be immediately changed if the calculated loading rates are inconsistent with predetermined target goals.

In an example embodiment of the metal deposition process modeling aspect of the present invention, each region of the reactor water flow circuit is characterized as being comprised of smaller "cells" of equal flow residence time. In this manner, non-steady state mass balances can be maintained where parallel flow regions merge despite unequal flow residence times in each region. Mass balances are performed on all cells to account for transport-in, transport-out and chemical reactions. The concentrations of all relevant ionic species (including $Cl^-$, $Na^+$, $NO_2^-$, $NO_3^-$, $SO_4^-$, $ZnOH$, $Pt(OH)_6^{--}$, $Rh(NO_2)_6^{---}$, $OH^-$, $H^+$) are determined based upon the initial concentrations in the flow circuit, measured concentrations in inlet and outlet streams, reactor water clean-up efficiency and local reaction rates. The cumulative concentrations of all the ionic species are then used to determine pH and conductivity. Reaction rates are also determined both for bulk processes (such as the decomposition of noble metal complexes due to thermal decomposition, radiation and other chemicals) and the reactions of chemical species with the metal surfaces in the flow circuit, including the deposition of noble metal with the simultaneous formation of $OH^-$ or $NO_2^-$. These surface reaction rates are used for determining noble metal accumulation rates and consequent accumulated noble metal concentrations on the surfaces throughout the circuit.

In the disclosed example embodiment, the noble metal application process modeling routine of the present invention is complemented with conventional macro routines for generating and displaying prescribed graphs from initial data and for importing new data developed from each "run" (i.e., execution of the process modeling software) so that selected graphs may be re-plotted as desired. For example, a macro routine is provided for importing data from a modeling run into an Excel™ workbook containing forms for generating prescribed graphs of interest. Likewise, another macro routine is provided for linking an Excel™ workbook containing a graph to a previously generated set of graphs.

The modeling method of the present invention is also useful in performing non-steady state evaluations of water chemistry transients in BWRs. For example, concentrations of water impurities in a BWR due to leaking fuel rods, corroding components or other intrusions can be easily modeled by including "source" terms in the modeling routine to represent an impurities at probable locations that might account for their appearance. Likewise, the disappearance of various impurities, for example, due to incorporation into crud or radioactive decay, can be accounted for by including representative "sink" terms in the modeling routine. In this manner, the non-steady state concentration of radioactive isotopes, corrosion products and water impurities could be determined for the entire water flow circuit(s) throughout the reactor and in the steam for performing, for example, analysis on fuel leaks and corrosion.

BRIEF DESCRIPTION OF THE DRAWINGS

FIG. 4 is a diagram illustrating an example of the general procedural steps for using the noble metal application process modeling software of the present invention.

DETAILED DESCRIPTION OF THE INVENTION

Figure 1:
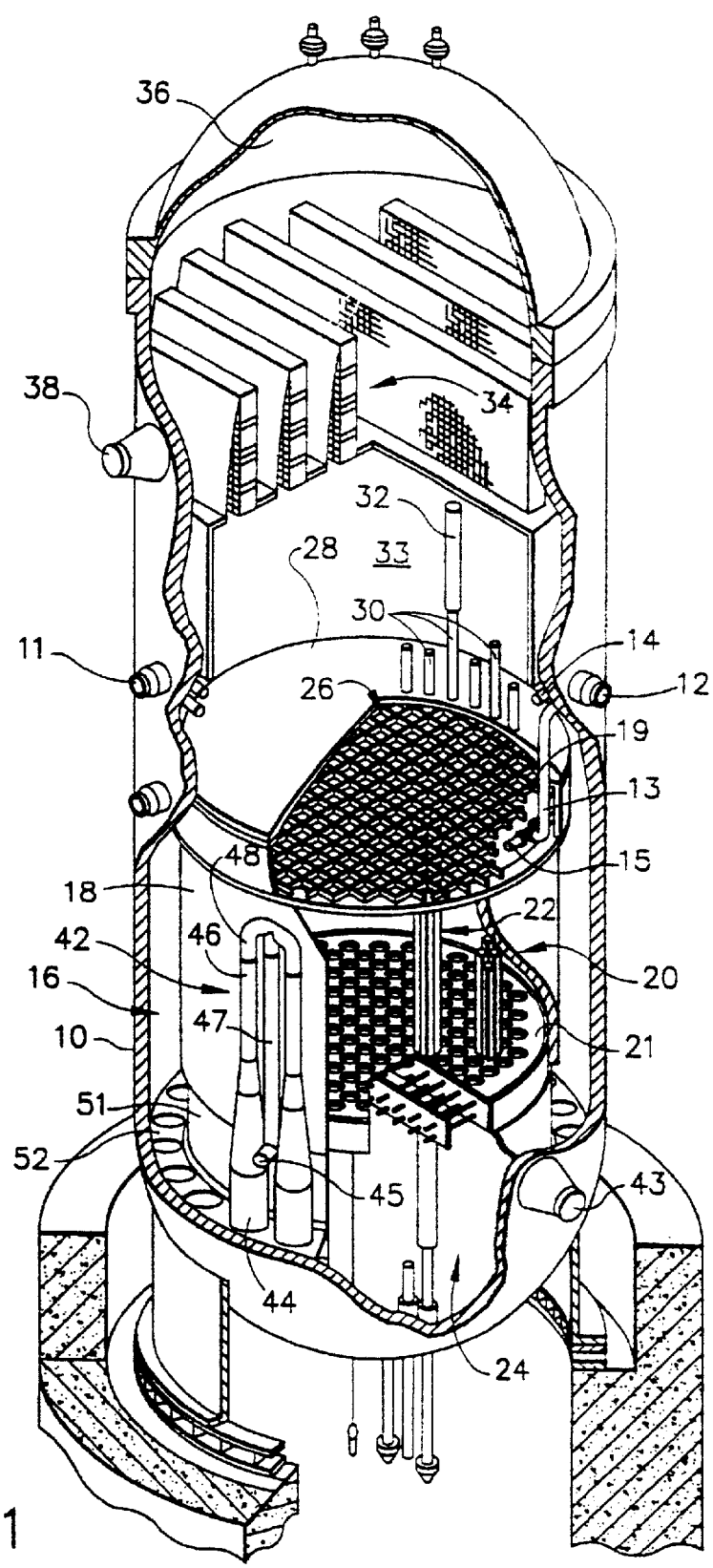
FIG. 1 is a schematic showing a partially cutaway perspective view of a conventional BWR.

The fluid flow in a boiling water reactor (BWR) will be generally described with reference to FIG. 1. Feed-water is admitted into a reactor pressure vessel (RPV) 10 via a feed-water inlet 12 and a feed-water sparger 14, which is a ring-shaped pipe having suitable apertures for circumferentially distributing the feed-water inside the RPV. A core spray inlet 11 supplies water to a core spray sparger 15 via core spray line 13. The feed-water from feed-water sparger 14 flows downwardly through the downcomer annulus 16, which is an annular region between RPV 10 and core shroud 18. Core shroud 18 is a stainless steel cylinder which surrounds the core 20 comprising numerous fuel assemblies 22 (only two 2×2 arrays of which are depicted in FIG. 1). Each fuel assembly is supported at the top by top guide 19 and at the bottom by core plate 21. Water flowing through downcomer annulus 16 then flows to the core lower plenum 24.

The water subsequently enters the fuel assemblies 22 disposed within core 20, wherein a boiling boundary layer (not shown) is established. A mixture of water and steam enters core upper plenum 26 under shroud head 28. Core upper plenum 26 provides standoff between the steam-water mixture exiting core 20 and entering vertical standpipes 30, which are disposed atop shroud head 28 and in fluid communication with core upper plenum 26.

The steam-water mixture flows through standpipes 30 and enters steam separators 32, which are of the axial-flow centrifugal type. The separated liquid water then mixes with feed-water in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR may have sixteen to twenty-four inlet mixers.

During an in situ noble metal application process for a BWR, it is perhaps most useful to know of the degree of noble metal loading as a function of location along water flow paths within the BWR. Consequently, in the method of the present invention, distinct regions of water flow are subdivided into multiple cells for modeling and analysis. In addition, since mass balances must be maintained wherever parallel flow regions merge despite unequal flow residence times within the region, the modeling routine of the present invention selects cells having equal flow time.

Figure 2:
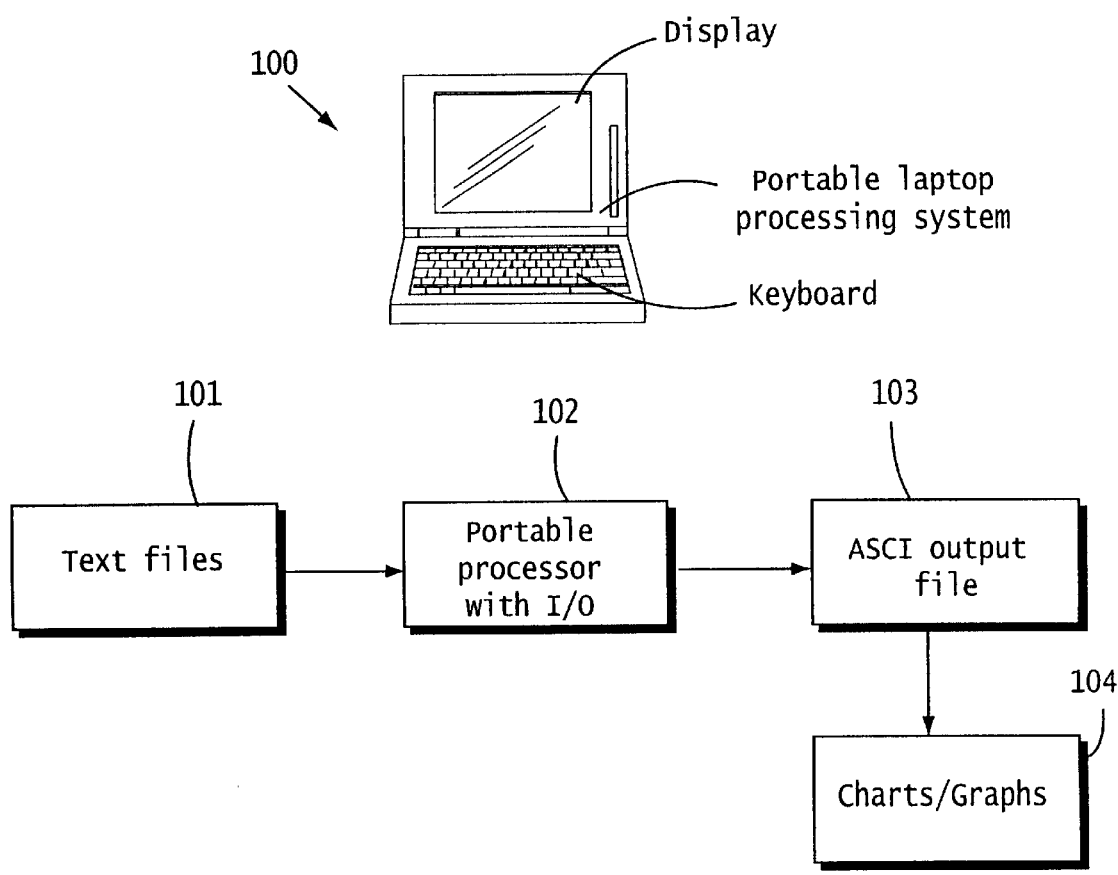
FIG. 2 is a diagram illustrating an example system including a block diagram illustrating the use of a portable processing arrangement for utilizing the modeling software of present invention.

Referring now to FIG. 2, an example portable computing system 100 for utilizing the modeling software of present invention is shown along with a block diagram below it illustrating the general input/output processing flow of information. For example, text files 101 containing initialization parameters and other data may be created (or input from an alternate source) on a portable processor 102 using conventional programming applications such as Excel.™ After the noble metal loading simulation/modeling program of the present invention is run, an ASCI output file 103 containing computed model data is produced for displaying charts/graphs 104 of the modeled noble metal loading.

Figure 3:
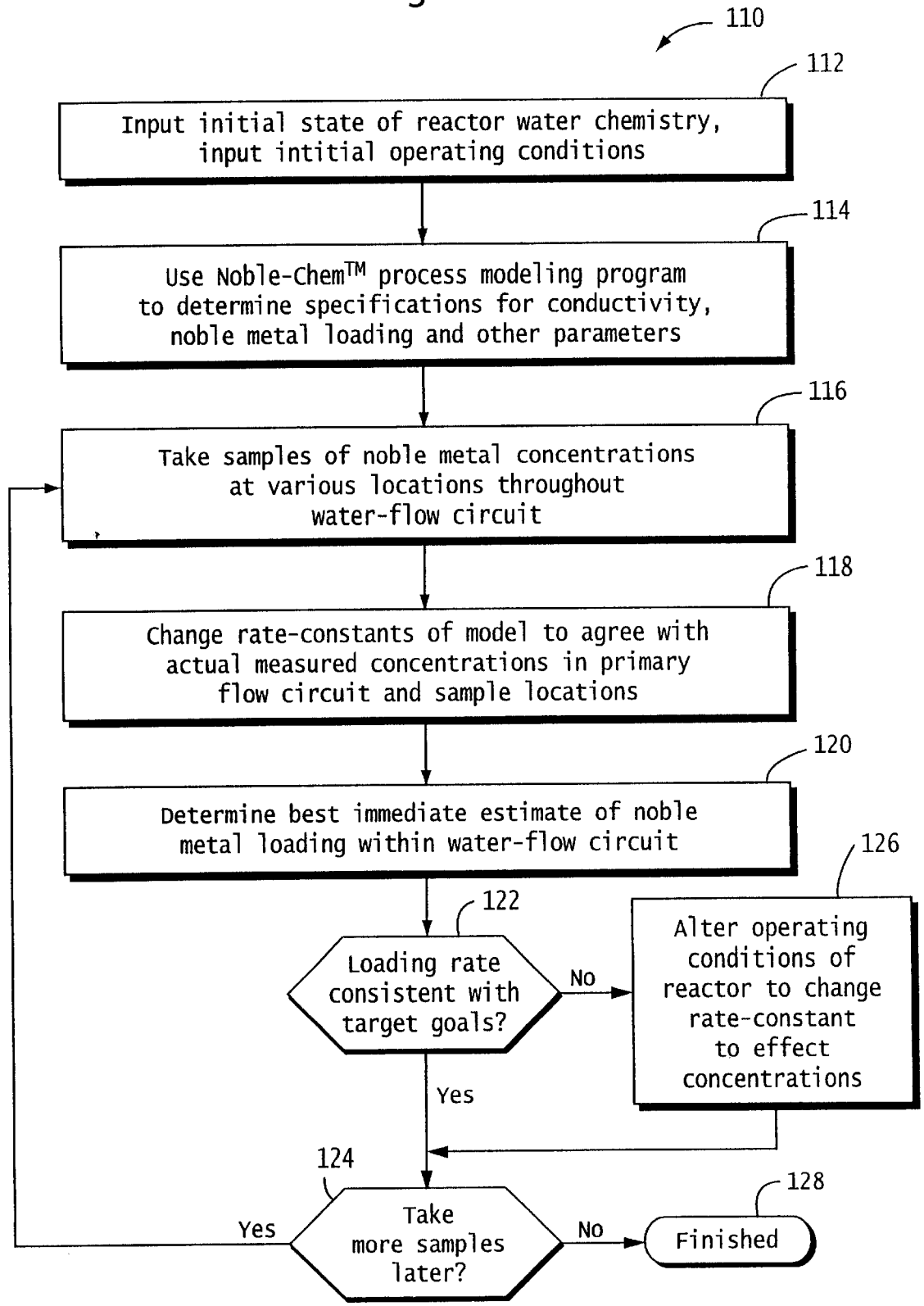
FIG. 3 is a flow diagram illustrating an exemplary method for implementing the present invention.

FIG. 3 shows a flow diagram 110 that illustrates exemplary steps the present method for evaluating and maintaining the proper noble metal loading during an in situ noble metal application process such as mentioned above. Each box of the diagram of FIG. 3 contains a concise explanation of a particular step for this example embodiment of the method of the present invention. As indicated at block 112, the initial state of reactor water chemistry and initial operating conditions are input by a user on a processing system (100) containing the modeling program of the present invention. The modeling program is then run which computes, at block 114, noble metal loading throughout the flow circuit, specifications for conductivity and other parameters based on the input parameters. The user then proceeds to obtain samples of noble metal concentrations at various locations throughout the water-flow circuit within the reactor, as indicated at block 116. The actual measured concentrations from the acquired samples can then be compared to the computed model results for corresponding locations and may be used to alter particular rate-constants employed by the modeling program, as indicated at block 118, until the modeling program output agrees with the actual measured concentrations. Once the modeling program is effectively "calibrated" in this manner, it may then may be run again at various times during the application process, as indicated at block 120, to provide an immediate best estimate of noble metal loading for any desired location within the reactor water-flow circuit.

If the computed best estimate of noble metal loading is consistent with predetermined target goals for the noble metal application process (block 122), further samples may be taken at later times (block 124) to continue the evaluation process or, alternatively, the evaluation may be terminated (block 128). After the above "calibration" of the modeling program (block 118) has been achieved, if a subsequent computed best estimate of noble metal loading (block 120) is not consistent with the targeted goals of the NobleChem™ process for the reactor (block 122), then such divergence(s) may serve as an indication that the operating conditions of the reactor may need to be at least temporarily altered (block 126). For example, the noble metals in the water flow circuit can be altered by producing a change in the rate-constant effected by changing the current operational criteria/conditions of the reactor.

FIG. 4 covers some example general procedural steps which may be followed for using the simulation/modeling software of the present invention. Referring now to FIG. 4, steps 202 through 210 illustrate example steps performed before the noble metal deposition process simulation/modeling routine is launched. For example, the user/operator may begin by opening the workbook application for running the modeling program installed on a portable (or other) computer (block 202). The user/operator then inputs simulation parameters for the process including, for example, initial concentrations, reactor operating parameters, and chemical parameters and rate constants for the particular reactor and the noble metal application process (block 204). Next, the user/operator runs a set-up macro for the noble metal loading simulation/modeling program (block 206). This is a simple set-up macro that has been created to produce a text file of predetermined format containing labels and values for various input parameters and reactor specific geometric parameters, which may be provided, for example, from reactor-specific spreadsheet data stored within the same computer (block 208). The macro then launches the executable modeling program (block 210) stored on the same computer for performing the noble metal loading computations and analysis, the results of which may be locally displayed for immediate review.

Basically, the modeling method implemented by the noble metal application process simulation program of the present invention integrates kinetic flow equations in a non-steady state system comprised of individual fluid-slug flow regions and sub-regions within the reactor. Some of these flow regions are considered as coupled and flowing in series, and some in parallel. This approach can be applied using conventional kinetic equations, because it basically models a set of mass balances in series—although a somewhat more basic linear modeling embodiment is preferred as a reasonable and easily implemented approximation to actual reactor conditions. If desired, more detailed and non-linear fluid kinetics may be assumed and used to more accurately model conditions within particular reactors. The specific rate constants referred to in the following discussion of applicable kinetic data may also be altered accordingly, as determined by empirical data.

Kinetic Equations

The basic equations for determining loading and decomposition are as follows:

$d(c)/dt = -(k_s + k_t + k_z + k_r)c$ (rate of destruction of noble metal compound)

$d(s)/dt = k_s c (D_h/4)$ (rate of surface loading of noble metal compound)

$d(d)/dt = -(k_t + k_z + k_r)c$ (rate of creation of inactive noble metal species)

where:

c=concentration of noble metal for the injected compound, g (or g moles) metal/unit volume d=concentration of metal for the deactivated compound, g (or g-moles) metal/unit volume s=surface concentration of noble metal, g (or g-moles) metal/unit area As knowledge of the noble metal kinetics improves, one of ordinary skill will appreciate that it may become necessary to make this example model more complex. For example, although it is not commonly known whether deactivation is actually heterogeneous (occurring at surfaces) or homogeneous, it is assumed to be homogeneous in the example embodiment disclosed herein. Particles of deactivated noble metal may collide with the surface, and deposit some otherwise deactivated noble metal. Particles of deactivated noble metal or crud may also be responsible for deactivation. If so, then one must account for the particle size distribution. In any event, the framework of the model presented herein should work with any kinetics.

In the example embodiment herein, it is assumed that all reaction rate constants may be represented by the Arrhenius formula as follows:

$$k_s = A_s(4/D_h)\exp[-B_s/RT] \text{ surface}$$

$$k_t = A_t \exp[-B_t/RT] \text{ thermal}$$

$$k_z = A_z Zn \exp[-B_z/RT] \text{ zinc}$$

$$k_r = A_r G \exp[-B_r/RT] \text{ radiation}$$

where:
$D_h$ is the hydraulic diameter
$Zn$ is the zinc concentration
$G$ is the gamma dose rate.
The overall rate constant is defined by:

$$k_o = (A_s(4/D_h)\exp[-B_s/RT] + A_t \exp[-B_t/RT] + A_z Zn \exp[-B_z/RT] + A_r G \exp[-B_r/RT])$$

so that $$d(c)/dt = -k_o c$$

Example General Modeling Approach

The approach of the present invention in applying the above equations is to divide each flow region and sub-region of the reactor into sub-lengths such that the residence time of every sub-length is $\Delta t$. This makes it straight-forward to analyze any fluid element using a total time derivative. In this way, it is possible to follow individual "slugs" of water as they flow from one sub-length to the next. Also, using this approach, it is possible to add parallel streams together and ensure that a true mass balance is maintained. Example regions and sub-regions of the reactor are defined a list provided at the end of this discussion. For this example, $\Delta t$ should equal 1 second, although the user can elect to select a different value. However, selecting a much larger value for $\Delta t$ would result in bypassing the sub-regions of shortest residence time, which should be avoided.

Each sub-region of the primary system is characterized by the following primary quantities:
Length (L)
Surface area (S)
Volume (V)
Flow rate (Q)
The water flow velocity in a sub-region is given by:

$$v = QL/\rho V$$

In a given region, the sub-length is given by:

$$\Delta L = \Delta t v = \Delta t QL\rho V$$

The number of sub-lengths in a region is given by:

$$n = L/\Delta L$$

In practice, n is rounded up to the next nearest integer. Because of this rounding, the formulation only represents the geometry approximately. However, this should only have a small effect on the results. The effect is minor compared with some of the assumptions in the model, such as the use of simple rate expressions and kinetics, the neglect of any influence of crud, and the use of plug flow in all regions.

At time $m\Delta t$, each sub-length in each region is characterized by values of c, d, and s. In most cases, these will be set equal to 0 when time equals 0. However, non-zero values may also be used at time 0, depending on the application.

Suppose the sub-lengths of a region are numbered from 1 to n. For the general interior sub-length i, with concentrations c(i, m$\Delta t$), d(i, m$\Delta t$), and s(i, m$\Delta t$) at time m$\Delta t$, the concentrations at time (m+1)$\Delta t$ are given by $$c(i, (m+1)\Delta t) = c(i-1, m\Delta t) - k_o c(i-1, m\Delta t)\Delta t$$

$$d(i, (m+1)\Delta t) = d(i-1, m\Delta t) + (k_t + k_z + k_r)c(i-1, m\Delta t)\Delta t$$

$$s(i, (m+1)\Delta t) = s(i, m\Delta t) + (D_h/4)k_s c(i, m\Delta t)$$

An equation similar to the equation for c can be used for other species in the water, with appropriate modification of the rate constants to account for stoichiometry. For example, $OH^+$ ions are generated by the decomposition of $Pt(OH)_6^-$ ions. The equation of change of $OH^-$ is:

$$OH^-(i, (m+1)\Delta t)) = OH^-(i-1, m\Delta t) + 6f_{OH^-} k_{o,Pt} c_{Pt\_complex}(i-1, m\Delta t)\Delta t$$

where c is on a molar basis, and $f_{OH^-}$ is the fraction of the OH groups converted to ions.

Similarly, the equation for change of $NO_2^-$ due to the decomposition of $Rh(NO_2)_6^{+++}$ is $$NO_2^-(i, (m+1)\Delta t)) = NO_2^-(i-1, m\Delta t) + 6k_{o,Rh} c_{Rh\_complex}(i-1, m\Delta t)\Delta t$$

where the process is assumed to be 100% efficient.

Region Entrance Conditions

In addition to the general interior sub-lengths, the inlet and outlet conditions for each region, corresponding to the first and last sub-lengths of a region, are specified. For simplicity, any inlet flow or outlet flows will occur between the last sub-length of a sub-region and the first sub-length of the next sub-region.

Consider the beginning of a sub-region receiving flows $Q_1$, $Q_2$, and $Q_3$, with active concentrations $c_1$, $c_2$, and $c_3$ and deactivated concentrations $d_1$, $d_2$, and d from three separate sources (this is the maximum I believe required for this system). The flows may either be from other sub-regions leading into the sub-region or inlet flows to the system. For example, at the entrance to the upper plenum, $Q_1$ is the fuel channel flow, $Q_2$ is the core bypass flow, and $Q_3$ is the outer bypass flow.

The flow rate for the new sub-region is $$Q = Q_1 + Q_2 + Q_3$$

the active concentration is $$c = (Q_1 c_1 + Q_2 c_2 + Q_3 c_3)/Q$$

and the inactive concentration is $$d = (Q_1 d_1 + Q_2 d_2 + Q_3 d_3)/Q$$

The same set of equations may be used if there is an outlet stream. For the outlet stream, the sign of Q is negative.

Example Specifications for Pt and Rh Process

Example species that are tracked in the flow water are shown below in Table 1.

TABLE 1

Species whose concentrations are tracked by the model

| Species | Concentration label |
|---|---|
| $Cl^-$ | CLM |
| $H^+$ | HP |
| H2O | H2O |
| $Na^+$ | NAP |
| $Pt(OH)_6^-$ | PTOH6MM |
| $Rh(NO_2)_6^{+++}$ | RHNO26MMM |
| $NH_3$ | NH3 |
| $NO_2^-$ | NO2M |
| $NO_3^-$ | NO3M |
| $OH^-$ | OHM |
| Pt (deactivated form) | PT_DEACT |
| Rh (deactivated form) | RH_DEACT |
| $SO_4^{--}$ | SO4MM |
| Zn | ZN |
| $ZnOH^+$ | ZNOHP |

In the present example, in addition to the above listed components, surface-loaded concentrations of Pt and Rh are also tracked. The labels used for such are PT_SURF and RH_SURF, respectively.

The concentrations of chemical species are calculated by mass balance throughout the reactor. The only species of interest that is not calculated by mass balance is zinc. This is because: 1) zinc appears to reach an equilibrium value, unaffected by the parameters of the model; 2) we do not currently have a method to calculate zinc concentrations; and 3) zinc is only used in order to predict the conductivity. Initially, the zinc concentration will only be measured and input (as listed in Table 6). If there is supporting data, the zinc concentration may later be used in the calculation of $k_z$.

Table 2 shown immediately below lists example chemical parameters used by the modeling program of the present invention. These are parameters used to 1) calculate the rate of change of the active chemicals, 2) calculate conductivity, 3) calculate pH.

TABLE 2

Chemical parameters

| Chemical parameter | Label |
|---|---|
| Bulk decomposition rate constant for $Na_2Pt(OH)_6$ | KB_PT |
| Bulk decomposition rate constant for $Na_3Rh(NO_2)_6$ | KB_RH |
| Equivalent conductance of active $Pt(OH)_6$ | COND_PTOH6MM |
| Equivalent conductance of active $Rh(NO_2)_6$ | COND_RHNO26MMM |
| Equivalent conductance of CF | COND_CLM |
| Equivalent conductance of $H^+$ | COND_HP |
| Equivalent conductance of $Na^+$ | COND_NAP |
| Equivalent conductance of $NO_2^-$ | COND_NO2M |
| Equivalent conductance of $NO_3^-$ | COND_NO3M |
| Equivalent conductance of $OH^-$ | COND_OHM |
| Equivalent conductance of $SO_4^{--}$ | COND_SO4MM |
| Equivalent conductance of $ZnOH^+$ | COND_ZNOHP |
| Fraction of OH given off as OH from $Pt(OH)_6$ decomp. | FROHM |
| Ion-constant product for H2O | KW |
| Ionization constant for Zn | KI_ZN |
| Radiation-induced decomp. rate constant for $Na_2Pt(OH)_6$ | KR_PT |
| Radiation-induced decomp. rate constant for $Na_3Rh(NO_2)_6$ | KR_RH |
| Surface loading rate constant for $Na_2Pt(OH)_6$ | KS_PT |
| Surface loading rate constant for $Na_3Rh(NO_2)_6$ | KS_RH |

Numerical values for flow lengths, volumes, and surface areas are provided by the user for each of the reactor regions. Table 3 below provides a list of labels used to define these quantities in the example modeling program. The corresponding values are provided by the user (e.g., determined externally and provided to the modeling program). In this example, provisions are made for using up to three segments per sample line with differing geometry, but constant mass flow rate. In addition to the primary circuit, two sample lines are included.

TABLE 3

Length, surface, and volume labels

| Sub-region | Length label | Surface area label | Volume Label |
|---|---|---|---|
| Fuel channel | LFUEL | SFUEL | VFUEL |
| Region H fuel channel | LFUELH | SFUELH | VFUELH |
| Core bypass, g | LCORBYP | SCORBYP | VCORBYP |
| Region H bypass | LCORBYPH | SCORBYPH | VCORBYPH |
| Outer bypass | LOBYP | SOBYP | VOBYP |
| Region H outer bypass | LOBYPH | SOBYPH | VOBYPH |
| Upper plenum | LUPLEN | SUPLEN | VUPLEN |
| Steam separator region 1 | LSS1 | SSS1 | VSS1 |
| Steam separator region 2 | LSS2 | SSS2 | VSS2 |
| Steam separator region 3 | LSS3 | SSS3 | VSS3 |
| Steam separator region 4 | LSS4 | SSS4 | VSS4 |
| Steam separator region 5 | LSS5 | SSS5 | VSS5 |
| Steam separator region 6 | LSS6 | SSS6 | VSS6 |
| Mixing plenum, above feedwater mix | LMPA | SMPA | VMPA |
| Mixing plenum, below feedwater mix | LMPB | SMPB | VMPB |
| Downcomer, s1 start | LD1 | SD1 | VD1 |
| Downcomer, s1 carry under | LD2 | SD2 | VD2 |
| Downcomer, s2 + s31 | LD3 | SD3 | VD3 |
| Downcomer, s32 + s4 + s5 | LD4 | SD4 | VD4 |
| Recirc suction pipe | LR1 | SR1 | VR1 |
| Recirc discharge pipe | LR2 | SR2 | VR2 |
| Recirc header ring | LR3 | SR3 | VR3 |
| Recirc riser pipe | LR4 | SR4 | VR4 |
| Recirc jet pump internal riser | LR5 | SR5 | VR5 |
| Recirc jet pump nozzle (rams head) | LR6 | SR6 | VR6 |
| Jetpump, throat | LJP1 | SJP1 | VJP1 |
| Jet pump, diffuser | LJP2 | SJP2 | VJP2 |
| Jet pump, tailpiece | LJP3 | SJP3 | VJP3 |
| Lower plenum, down-flow | LLP1 | SLP1 | VLP1 |
| Lower plenum, up-flow below core plate | LLP2 | SLP2 | VLP2 |
| Lower plenum, up-flow above core plate | LLP3 | SLP3 | VLP3 |
| Sample line A, 1st section | LSAMPA1 | SSAMPA1 | VSAMPA1 |
| Sample line A, 2nd section | LSAMPA2 | SSAMPA2 | VSAMPA2 |
| Sample line A, 3rd section | LSAMPA3 | SSAMPA3 | VSAMPA3 |
| Sample line B, 1st section | LSAMPB1 | SSAMPB1 | VSAMPB1 |
| Sample line B, 2nd section | LSAMPB2 | SSAMPB2 | VSAMPB2 |
| Sample line B, 3rd section | LSAMPB3 | SSAMPB3 | VSAMPB3 |

For the present example, Table 4 immediately below illustrates some additional reactor design parameters which the user may need to provide.

TABLE 4

Additional reactor design parameters

| Design parameter | Label |
|---|---|
| Fraction of bypass flow moving through outer bypass | FROUTER |
| Fraction of core flow moving through jet pumps | FRJETP |
| Fraction of flow exiting steam separator region 3 | FRSS3 |
| Fraction of core flow moving through fuel channels | FRCHAN |

TABLE 4-continued

Additional reactor design parameters

| Design parameter | Label |
| --- | --- |
| Number of fuel bundles | NBUNDLE |
| Number of jet pumps | JPNUMBER |
| Number of steam separators | SEPNUM |

Table 5 below shows example definitions and entrance conditions used for each sub-region. For each sub-region, the volume, length, and surface-to-volume ratio (which equals $4/D_h$) are provided by the user.

TABLE 5

Flows in primary loop (TF = total flow)

| Sub-region | Flow Label | Q (kg/s) | Entrance streams |
| --- | --- | --- | --- |
| Fuel channel | QFUEL | TF*FRCHAN/NBUNDLE | LP3 |
| Region H fuel channel | QFUELH | TF*FRCHAN/NBUNDLE | FUEL |
| Core bypass, g | QCORBYP | TF*(1-FRCHAN)*(1-FROUTER) | LP3 |
| Region H bypass | QCORBYPH | TF*(1-FRCHAN)*(1-FROUTER) | CORBYP |
| Outer bypass | QOBYP | TF*(1-FRCHAN)*FROUTER | LP3 |
| Region H outer bypass | QOBYPH | TF*(1-FRCHAN)*FROUTER | OBYP |
| Upper plenum | QUPLEN | TF | FUELH CORBYPH OBYPH |
| Steam separator region 1 | QSS1 | TF/SEPNUM | UPLEN |
| Steam separator region 2 | QSS2 | TF/SEPNUM | SS1 |
| Steam separator region 3 | QSS3 | TF/SEPNUM* FRSS3 | SS2 |
| Steam separator region 4 | QSS4 | TF/SEPNUM* (1-FRSS3) | SS2 |
| Steam separator region 5 | QSS5 | TF/SEPNUM* (1-FRSS3) | SS4 |
| Steam separator region 6 | QSS6 | 0 | |
| Mixing plenum, above fw mix | QMPA | TF | SS3 SS5 |
| Mixing plenum, below fw mix | QMPB | TF | MPA |
| Downcomer, s1 start | QD1 | TF | MPB |
| Downcomer, s1 carry under | QD2 | TF | D1 |
| Downcomer, s2 + s31 | QD3 | TF | D2 |
| Downcomer, s32 + s4 + s5 | QD4 | TF*(1-FRJETP) | D3 |
| Recirc suction pipe | QR1 | TF*(1-FRJETP)/2 | D4 |
| Recirc discharge pipe | QR2 | TF*(1-FRJETP)/2 | R1 |
| Recirc header ring | QR3 | TF*(1-FRJETP)/2 | R2 |
| Recirc riser pipe | QR4 | 2*TF*(1-FRJETP)/JPNUMBER | R3 |
| Recirc j.p. internal riser | QR5 | 2*TF*(1-FRJETP)/JPNUMBER | R4 |
| Recirc j.p. nozzle (rams head) | QR6 | 2*TF*(1-FRJETP)/JPNUMBER | R5 |
| Jet pump, throat | QJP1 | TF/JPNUMBER | D3 R6 |
| Jet pump, diffuser | QJP2 | TF/JPNUMBER | JP1 |
| Jet pump, tailpiece | QJP3 | TF/JPNUMBER | JP2 |
| L.P., down-flow | QLP1 | TF | JP3 |
| L.P., up-flow below c.p. | QLP2 | TF | QLP1 |
| L.P., up-flow above c.p. | QLP3 | TF | QLP2 |
| Sample line A, 1st section | QSAMPA1 | QSAMPA | EXITA |
| Sample line A, 2nd section | QSAMPA2 | QSAMPA | SAMPA1 |
| Sample line A, 3rd section | QSAMPA3 | QSAMPA | SAMPA2 |
| Sample line B, 1st section | QSAMPB1 | QSAMPB | EXITB |
| Sample line B, 2nd section | QSAMPB2 | QSAMPB | SAMPB1 |
| Sample line B, 3rd section | QSAMPB3 | QSAMPB | SAMPB2 |

In, for example, the NobleChem™ metal application process, the streams entering the loop (chemical injection, feedwater cleanup, control rod) and exiting the loop (sample line, recirculation to RWCU, drain line to RWCU) are extremely small compared with the core flow. None of these flows will significantly affect the velocity. Only the injection flow will significantly affect any local concentrations. The effects of the other streams on concentration, while ultimately important, are relatively slow and non-localized. Therefore, they can be lumped together. This is a useful simplification, in that it prevents the accumulation of numerical round-off errors. It is assumed that there are only two inlet flows (chemical injection and feedwater cleanup) and three outlets (RWCU from recirculation loop, and two sample lines). The control rod drive flow will be assumed to equal 0, and the feedwater cleanup flow rate assumed to equal the sum of the RWCU and sample line flow rates minus the injection stream flow rate.

The total flow (TF) in the primary system varies as water enters and exits. TF equals CF from the middle of the mixing plenum until the next entrance or exit stream. TF decreases by QSAMPA at the recirculation discharge. TF increases by QIS, the injection stream flow rate, at the recirculation header. TF decreases by QRWCU at the RWCU take-off point, assumed to be the bottom of the lower plenum. TF decreases by QSAMPB at core plate. Finally, TF increases by the amount (QRWCU+QSAMPA+QSAMPB−QIS) in the middle of the mixing plenum.

Table 6 shown immediately below lists example parameters to be input by the user. These values may be changed by the user. For example, the user may elect to change various chemical parameters in response to sample measurements taken in order to improve the match of the computed model to the actual NobleChem™ process. The operating parameters may be entered in steps. For this example, at least fifty of such steps are permitted.

TABLE 6

Example Operating parameters to be input by the user:

| Operating parameter | Label |
| --- | --- |
| Core flow rate (kg/h) | CF |
| Injection stream flow rate (kg/h) | QIS |
| $Na_2Pt(OH)_6$ inlet flow rate (g metal/h) | PTIN |
| $Na_3Rh(NO_2)_6$ inlet flow rate (g metal/h) | RHIN |

TABLE 6-continued

Example Operating parameters to be input by the user:

| Operating parameter | Label |
| --- | --- |
| Nitric acid inlet flow rate (moles/h) | HNO3 |
| RWCU efficiency (%) | EFFRWCU |
| RWCU flow rate (kg/h) | QRWCU |
| Sample line A flow rate (kg/h) | QSAMPA |
| Sample line B flow rate (kg/h) | QSAMPB |
| Sodium hydroxide inlet flow rate (moles/h) | NAOH |
| Temperature of water in reactor (degrees C.) | TEMPC |
| Thermal power at shutdown (MW) | THERM |
| Time between shutdown and beginning of simulation | TIMEDELAY |
| Water level (m) | WL |
| Zinc (total) in water (ppb) | ZN |

Table 7 shown immediately below summarizes some example intermediate parameters. These are values that are used by the model, and which will be not altered by the user. The average core dose rate is calculated as a function of the thermal power at shutdown and the time between shutdown and the beginning of the simulation. The water density is calculated as a function of temperature, and will change from its initial value if the temperature changes.

TABLE 7

Intermediate parameters

| Intermediate parameter | Label |
| --- | --- |
| Average core gamma dose rate (MRad/hr) | GAMMA |
| Water density (kg/m$^3$) | DENS |

Example Simulation Program

FIGS. 5A–5E are flow diagrams illustrating example functional steps performed by the executable noble metal application modeling routine of the present invention. One of ordinary skill will appreciate that such steps may be implemented on any particular computer by utilizing conventional programming techniques and programming tools well known in the art.

Figure 5A:
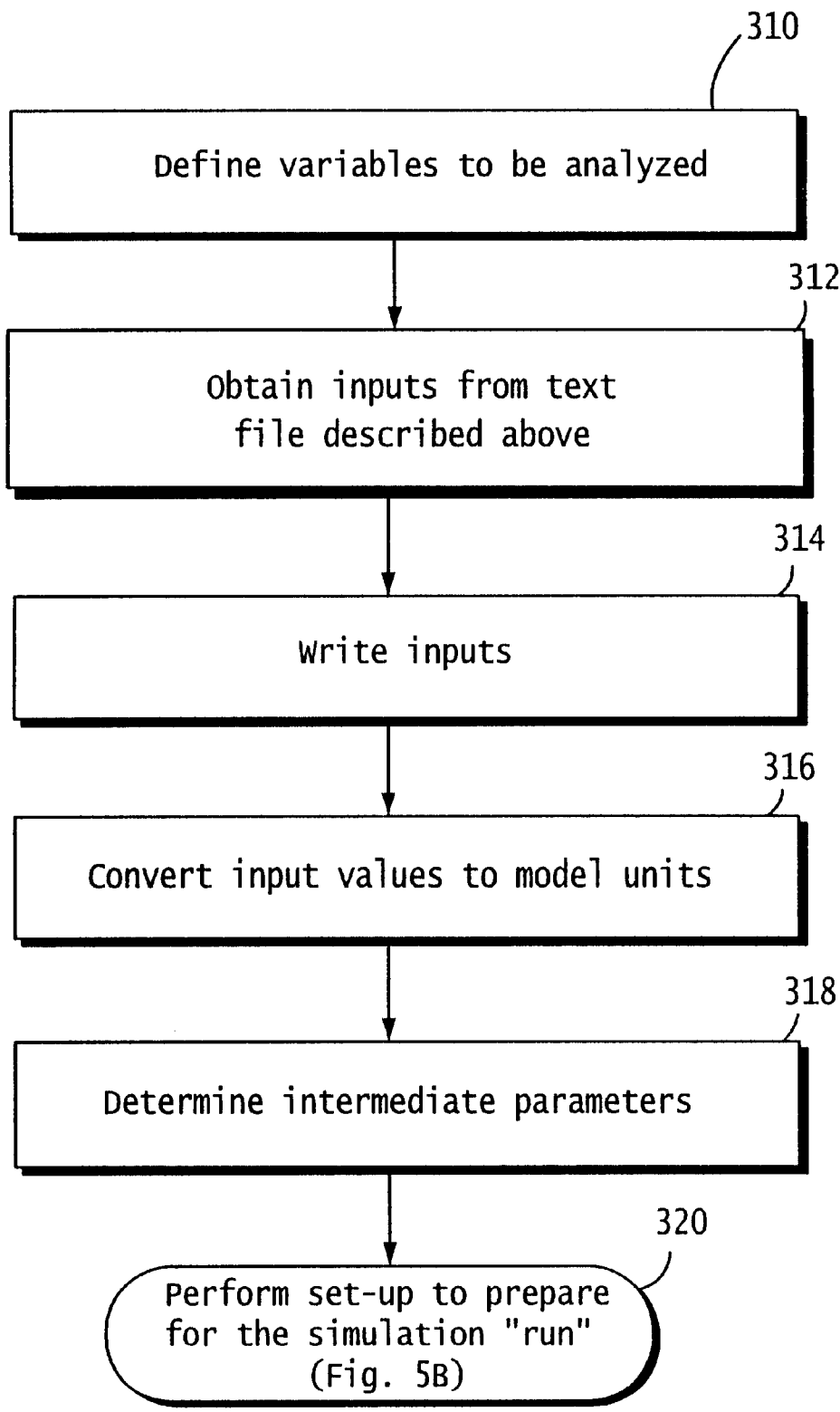
FIGS. 5A–5E illustrate an exemplary program flow diagram for the metal application process modeling software of the present invention.

Referring now to FIG. 5A, blocks 310 to 320 illustrate example steps for initializing the modeling computations. For example, a text file previously created by the user (see FIG. 4) defines the noble metal application process variables to be analyzed (block 310). Input values are obtained from the text file (blocks 312 and 314) and converted to model units (block 316). Intermediate parameters are then computed (block 318) and set up to prepare for the modeling/simulation run (320) as further described with respect to FIG. 5B.

Figure 5B:
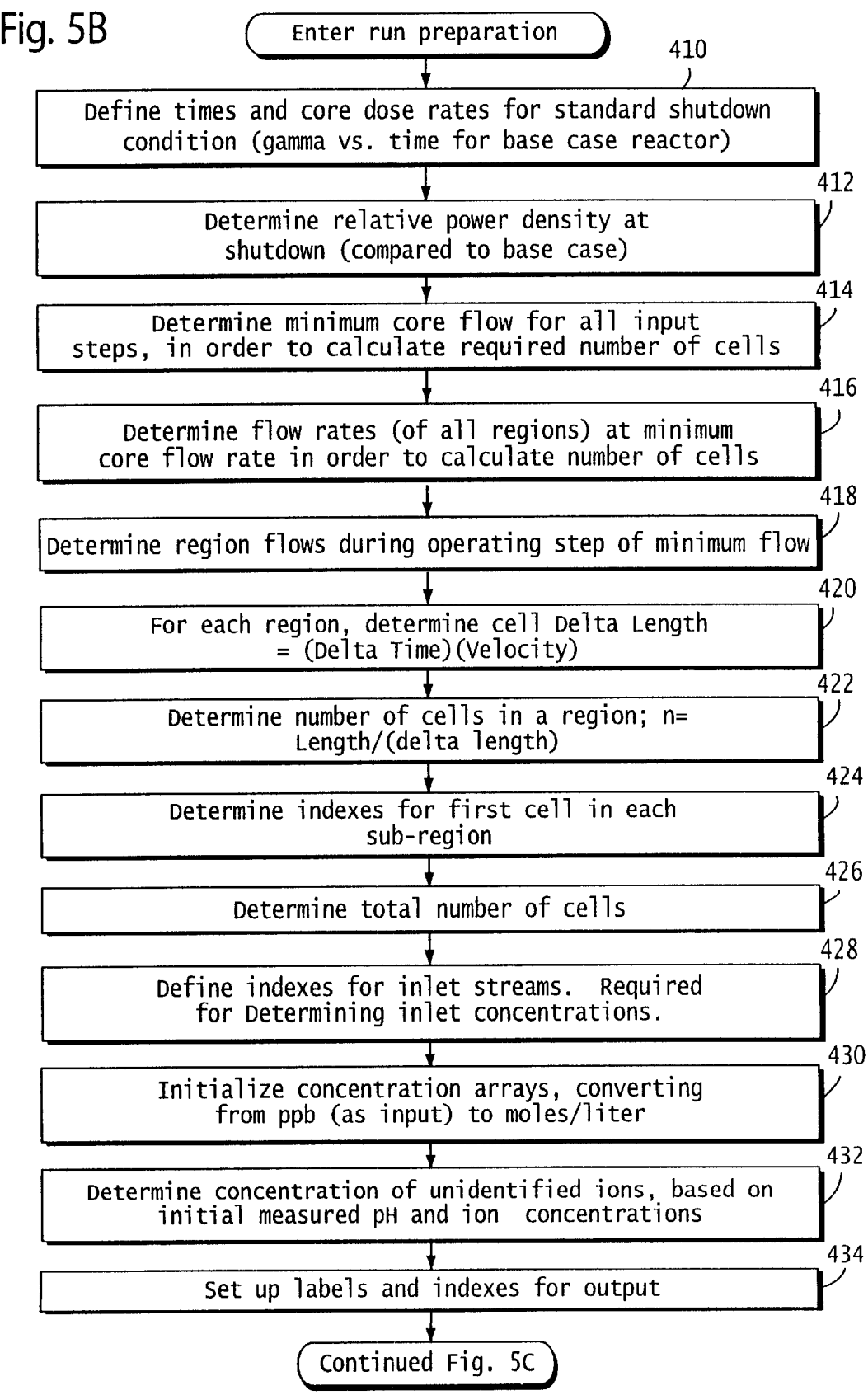

Referring now to FIG. 5B, blocks 410 through 434 illustrate example steps for preparing and computing internal parameters used in the process modeling/simulation. For example, times and core dose rates (e.g., gamma vs. time for base case reactor) for standard shutdown condition are defined (block 410). Relative power density at shutdown (compared to base case) is determined (block 412). Minimum core flow for all input steps is computed to determine the required number of cells (block 414). Flow rates (of all regions) at minimum core flow rate are computed to determine the number of cells (block 416). Region flows during operating step of minimum flow are determined (block 418). The cell Delta Length is computed for each region (block 420). The number of cells in each region is computed (block 422). Indexes for the first cell in each sub-region are determined (block 424) and the total number of cells is then determined (block 426). Next, indexes for inlet streams are defined (block 428) and arrays for tracking concentrations are created and initialized (block 430), converting values from ppb (as input) to moles/liter. Next, the concentrations of unidentified ions are computed based on initial measured pH and noble metals (block 432) and labels and indexes are set up for output (434).

Figure 5C:
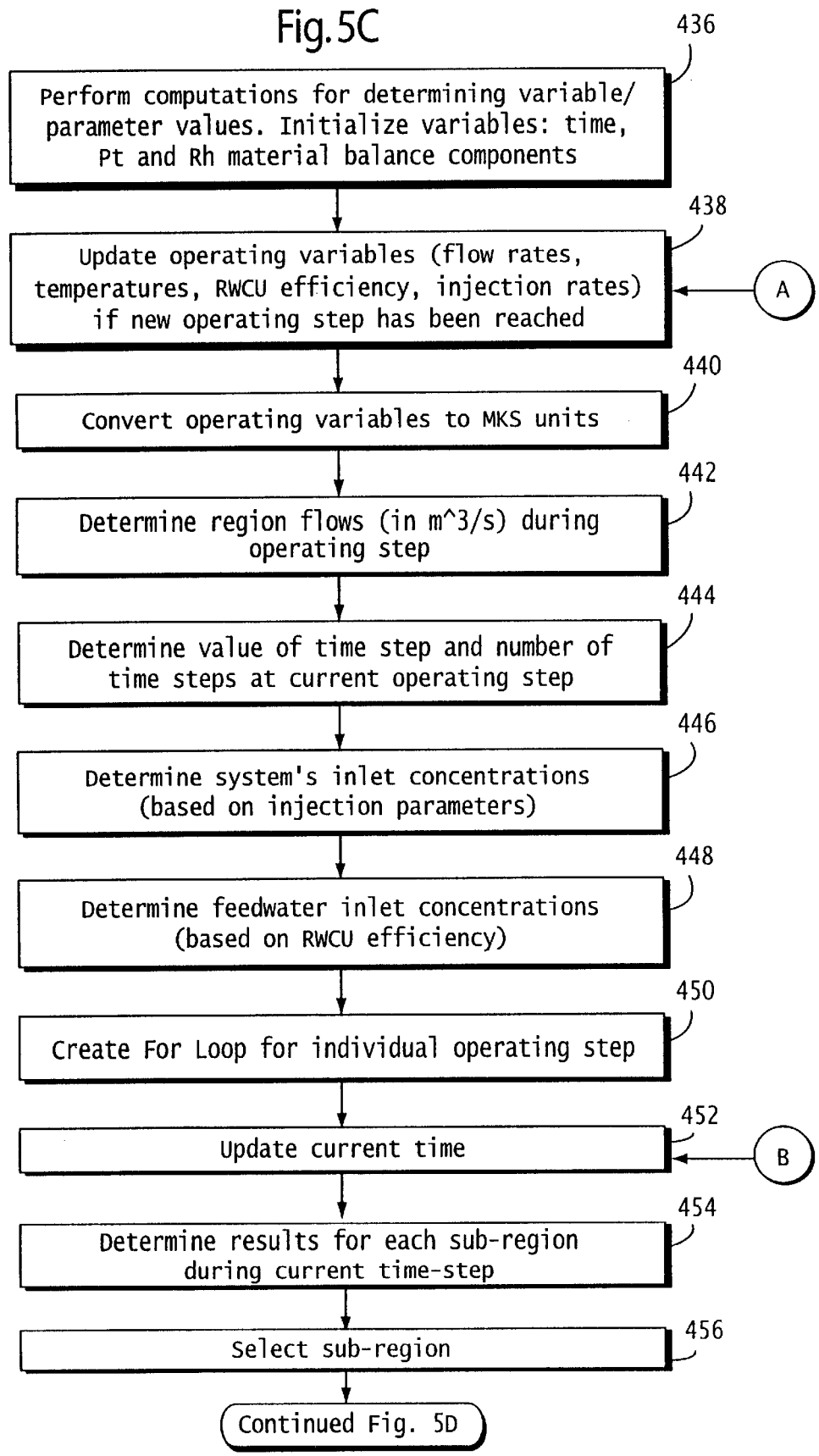

Referring next to FIG. 5C, blocks 436 through 456 illustrate example steps for performing computations for determining concentrations of chemicals and noble metal loading rates. For example, computations are performed for determining variable/parameter values; and variables representing time, Pt and Rh material balance components are initialized (block 436). At this point, operating variables (e.g., flow rates, temperatures, RWCU efficiency, injection rates) may be updated if the next operating time interval is reached (block 438). Next, operating variables are converted to MKS units (block 440), region flows are determined (in m$^3$/s) for the current operating time interval (block 442), the values of the time step and number of time steps in the current operating interval are determined (block 446), and feedwater inlet concentrations based on RWCU efficiency are computed (block 448). The individual operating time interval computations are then performed, for example, using a For/next loop (block 450). The current time is updated (block 452) and results for each sub-region during the current time-step are computed (block 454). Next, a sub-region is selected (block 456).

Figure 5D:
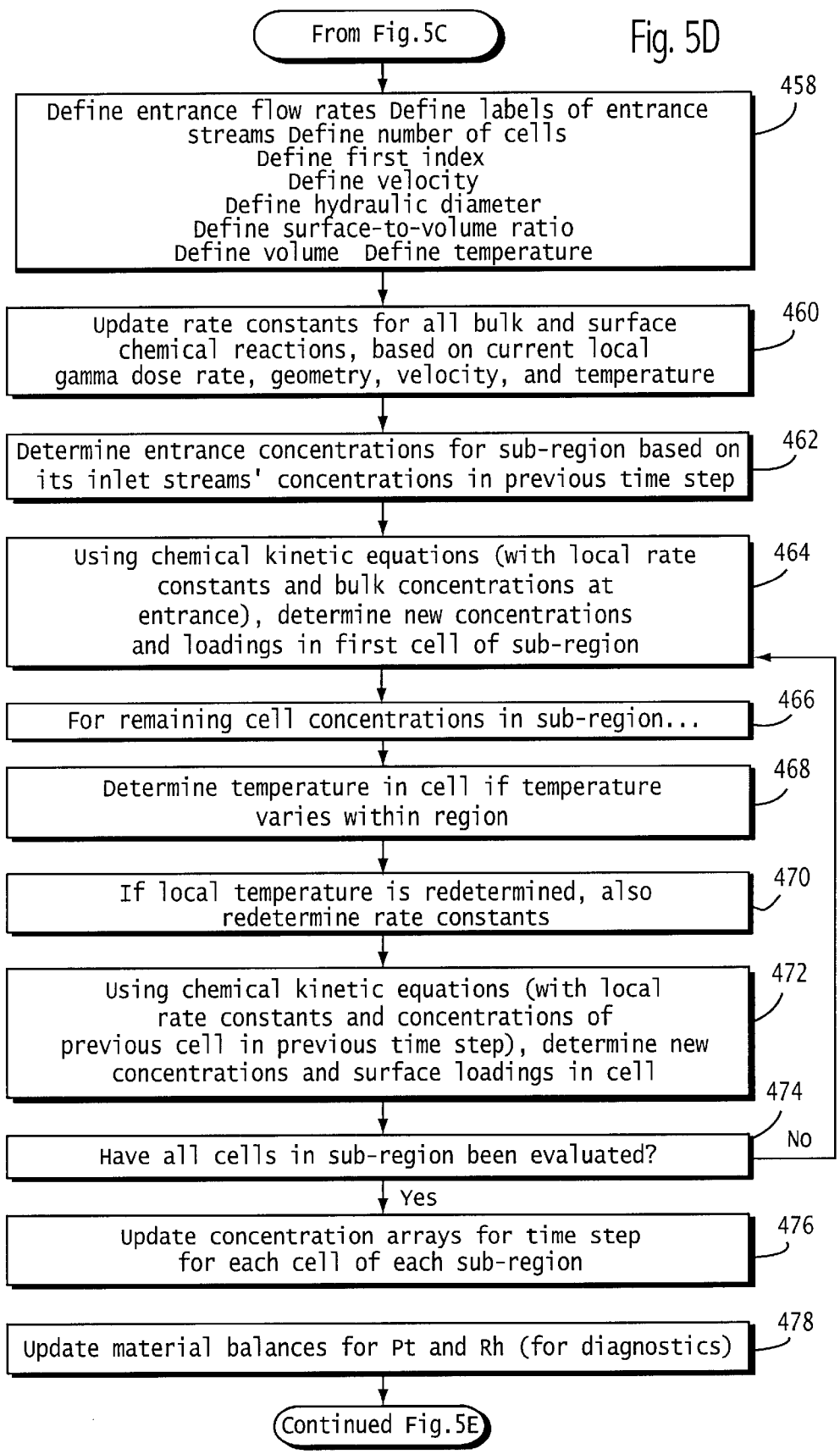

Referring now to FIG. 5D, entrance flow rates and labels of entrance streams are defined (block 458). The number of cells, first index, velocity, hydraulic diameter, surface-to-volume ratio, volume and temperature are also defined (block 458). Next, the rate constants foe all bulk and surface chemical reactions are updated based on current local gamma dose rate, geometry, velocity and temperature (block 460). Entrance concentrations for the sub-region are determined based on inlet streams concentrations in the previous operating time interval (block 462). Next, new concentrations and loadings of the first cell of the sub-region are computed using chemical kinetic equations based on local rate constants and bulk concentrations at the entrance (block 464). For the remaining cell concentrations in the sub-region, temperature in the cell is determined if the temperature varies within the region (block 468) and if local temperature is re-determined, the rate constants are also re-determined (block 470), and new concentrations and surface loadings in the cell are computed using chemical kinetic equations based on local rate constants and concentrations of the previous cell in the previous operating time interval (block 472). At this point, the steps in blocks 468 through 472 are performed again for each cell in the sub-region currently being evaluated until all cells in the sub-region have been evaluated (block 474). Next, the concentration arrays for the operating time interval for each cell of each sub-region and the material balances for Pt and Rh are updated (block 476 and block 478).

Figure 5E:
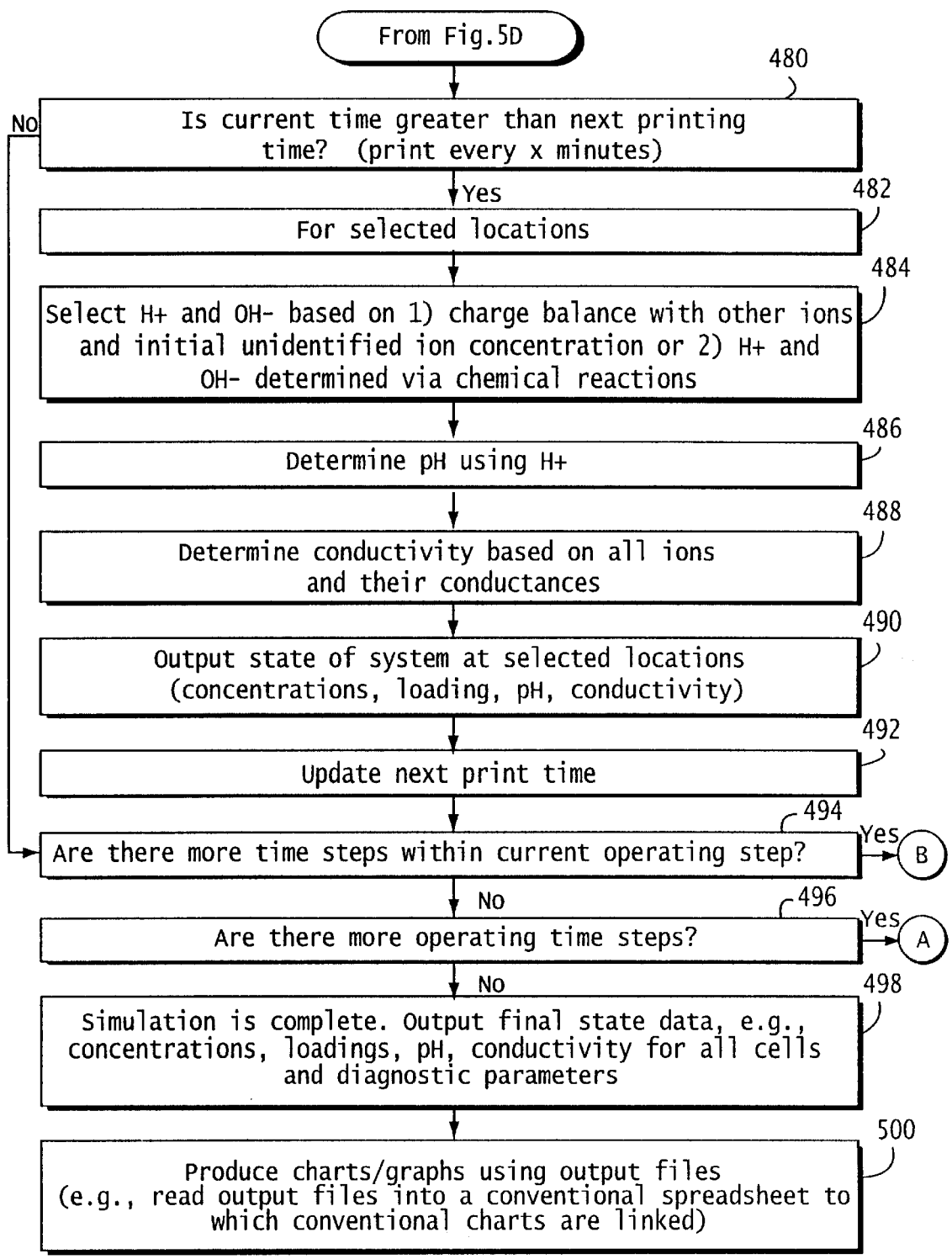

Referring now to FIG. 5E, blocks 480 through 508 illustrate example steps for assembling selected computed modeling/simulation results for output. Next, the current time is checked to determine if an output should be generated (block 480) in accordance with some user-selected predetermined output interval. For example, printing or displaying model results may be scheduled for every x minutes. If the current time is greater than the next scheduled output time, then for selected locations (block 482) the following steps are performed (blocks 484 through 492): H+ and OH− concentrations are selected based either on: 1) charge balance with other ions and initial unidentified ion concentration or 2) H+ and OH− concentrations are determined via chemical reactions (block 484); the pH is computed using H+ (block 486); the water conductivity is then computed based on all ions and their respective conductance (block 488); the state of the system (i.e., ion concentrations, loading, pH, conductivity, etc.) is output for the selected locations (block 490); and the next print time is then updated (block 492), after which processing continues with determining if more time steps remain in the current operating interval (block 494). Referring back to block 480 in FIG. 5E, if the current time is earlier than the next scheduled output time, then processing continues with determining if more time steps remain in the current operating interval (block 494).

If there more time steps remain within the current operating interval, the current time is updated (block 452 in FIG. 5C) and the modeling/simulation continues for another sub-region (block 454 in FIG. 5C). If there are no more time steps within the current operating interval (block 494), it is then determined if further operating time intervals remain to be evaluated (block 496). If further operating intervals are to be modeled, the processing continues with updating the operating variables for the next operating time interval (operating step), as indicated at block 438 (FIG. 5C). If no further operating intervals are to be processed, the simulation is essentially complete (block 498) and the final state data (i.e., ion concentrations, loadings, pH, and conductivity for all cells) may be output via printer or display (500).

In the above described example, non-steady state calculations are preferably performed for each second after the start of the noble metal application process. The output of the simulation model may be stored and plotted, for example, for each five minute interval in a simulated forty-eight hour application process period. A forty-eight hour simulation may be based on a set of step-wise inputs, as mentioned above. The user may select or change the time, $\Delta t$, between inputting sample data in order to check convergence. With the present arrangement, the user is provided easy access to the kinetic parameters used to calculate rate constants, equivalent conductance constants, and all other chemical parameters, so that they can be changed from a set of default values. For example, individual default parameters may be selectively displayed prominently on the output display device so that the user can easily restore them to the default values. The input file and simulation results (tables and charts) may also be copied, for example, to a separate Excel™ workbook.

Standard statistical analysis charts may be input by the user, for example, in an Excel™ workbook, along with the stored numeric results. Such standard charts may include information specifying, for example:

1. noble metal loading (1 five-curve chart for Pt and 1 for Rh versus time at two sample locations, bottom head, inner shroud, outer shroud).
2. Active noble metal concentrations (1 chart for Pt and Rh versus time at two sample locations).
3. Inactive noble metal concentrations (1 chart for Pt and Rh versus time at two sample locations).
4. Concentrations of ions (two charts for all ion concentrations versus time, one per sample location).
5. Conductivity (1 chart of conductivity versus time at two sample locations).
6. pH at 25 C. (1 chart of pH versus time at two sample locations).
7. Mass balance (2 charts for the sample locations, with curves of Rh loss, Pt loss, and %s unaccounted for based on other species concentrations).
8. Ionic balance (1 chart for net charge versus time at the sample locations)

The user may also make additional charts, for example, from the spreadsheets. A small window(s) in the computer display or printed output may be used to provide current values of critical results, e.g., gmsPt/min, loading rates, % unaccounted for, conductivity, hrs to maximum conductivity, hrs to loading targets (Pt and Rh), etc. Such window contents may be defined as desired by the user. For the present example embodiment, the two sides of the reactor are assumed to be identical and a new forty-eight hour run is computed and stored whenever the user changes the inputs.

The program code for the modeling/simulation routine of the present invention as illustrated in FIGS. 5A through 5E, may be written, for example, in a Visual Basic module in an Excel workbook. Sample data may be collected in the field and may be input to the modeling/simulation program from a spreadsheet. Such data may include measurements, for example, from GFAA (soluble Pt and Rh), zinc, IC ions, conductivity, pH, temperature, etc. The spreadsheet may be formatted so that its contents can easily be added to selected graphs generated as output by the modeling/simulation program.

The following list provides a non-comprehensive listing of example regions and sub-regions of a reactor that may be modeled using the present invention:

| Region | Sub-region |
| --- | --- |
| Fuel | Fuel channel |
|  | Region H fuel channel |
| Core bypass | Core bypass, g |
|  | Region H bypass |
| Outer bypass | Outer bypass |
|  | Region H outer bypass |
| Upper plenum | Upper plenum |
| Steam separator | Steam separator region 1 |
|  | Steam separator region 2 |
|  | Steam separator region 3 |
|  | Steam separator region 4 |
|  | Steam separator region 5 |
|  | Steam separator region 6 |
| Mixing plenum | Mixing plenum, above feedwater mix |
|  | Mixing plenum, below feedwater mix |
| Downcomer | Downcomer, s1 start |
|  | Downcomer, s1 carry under |
|  | Downcomer, s2 + s31 |
|  | Downcomer, s32 + s4 + s5 |
| Recirculation | Recirculation suction pipe |
|  | Recirculation discharge pipe |
|  | Recirculation header ring |
|  | Recirculation riser pipe |
|  | Recirculation jet pump internal riser |
|  | Recirc jet pump nozzle (rams head) |
| Jet pump | Jet pump, throat |
|  | Jet pump, diffuser |
|  | Jet pump, tailpiece |
| Lower plenum | Lower plenum, down-flow |
|  | Lower plenum, up-flow below core plate |
|  | Lower plenum, up-flow above core plate |
| Sample line A | Sample line, 1st section |
|  | Sample line, 2nd section |
|  | Sample line, 3rd section |
| Sample line B | Sample line, 1st section |
|  | Sample line, 2nd section |
|  | Sample line, 3rd section |

The modeling program/routine of the present invention may also be used to perform non-steady state evaluations of water chemistry transients in BWRs. For example, concentrations of water impurities in a BWR due to leaking fuel rods, corroding components or other intrusions can be easily modeled by including "source" terms in the modeling routine to represent an impurities at probable locations that might account for their appearance. Likewise, the disappearance of various impurities, for example, due to incorporation into crud or radioactive decay, can be accounted for by including representative "sink" terms in the modeling routine. In this manner, the non-steady state concentration of radioactive isotopes, corrosion products and water impurities could be determined for the entire water flow circuit(s) throughout the reactor and in the steam for performing, for example, analysis on fuel leaks and corrosion.

The foregoing method and apparatus has been disclosed for the purpose of illustration. As should be obvious to one of ordinary skill in the art, the noble metal application process modeling program routines of the present invention could be adapted, with only slight modifications, to model other non-steady state fluid systems having flow loops that contain multiple regions of disparate geometry and parallel flow paths. Variations and modifications of the disclosed invention will be readily apparent to computer programming practitioners of ordinary skill or those skilled in the arts of boiling-water nuclear reactor operation and/or other non-steady state physical chemistry systems.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of modeling noble metal loading reactions for a noble metal deposition process throughout a water flow circuit of a nuclear reactor, comprising the steps of:

dividing the primary water circuit into a plurality of separate regions each comprising a plurality of cells of equal flow residence time;

performing a mass balance evaluation for each individual cell;

determining noble metal concentrations and surface loadings in each cell using chemical kinetic equations based on local reaction rate constants for each cell;

sampling the reactor water at one or more selected locations throughout the water flow circuit to determine concentrations of noble metals at each sample location; and updating one or more values used for local reaction rate constants based on sampled concentrations from said selected locations.

2. A method for modeling noble metal loading occurring within a water flow circuit for a nuclear reactor during a noble metal deposition process, comprising the steps performed by a computer of:

a) dividing the water flow circuit into a plurality of separate regions each comprising a plurality of cells of equal flow residence time;

b) determining noble metal concentrations and surface loadings in each cell using chemical kinetic equations based on local reaction rate constants for each cell; and c) updating one or more values used for local reaction rate constants based on sampled noble metal concentrations obtained from said selected locations within the water flow circuit.

3. A method of maintaining proper noble metal loading within a primary water flow circuit for a nuclear reactor for performing a noble metal deposition process, comprising the steps of:

a) obtaining data representing the initial state of the reactor water chemistry and initial operating conditions of the reactor;

b) using a computer to model noble metal loading throughout the primary water flow circuit, wherein noble metal loading reactions are modeled by dividing the primary water circuit into a plurality of separate regions each comprising a plurality of cells of equal flow residence time and performing a mass balance evaluation for each individual cell;

c) sampling the reactor water at one or more selected locations throughout the water flow circuit and measuring concentrations of noble metals for each sample;

d) comparing measured concentrations of noble metals from each sample with concentration values produced by the computer modeling in step (b);

e) calibrating a computer model used in computing noble metal reactions by altering values of reaction rate constants used by the computer model until the model results agree with the samples; and f) altering the operating conditions of the reactor if subsequent loading rates determined by the computer model are inconsistent with predetermined target goals.

4. The method as defined in claim 3, wherein modeling of noble metal loading is performed using a portable computer.

5. The method as defined in claim 3, wherein a computer modeling of the noble metal deposition also models reactor water chemistry, pH, and conductivity.

6. A method for controlling the amount of noble metal atoms deposited over time into an oxide layer present on a metal surface of an object in contact with a high temperature fluid containing a compound having said metal atoms, which metal atoms increase the corrosion resistance of said metal surface when present in the oxide film, said method comprising the steps of:

a) using a computer to model noble metal loading in the fluid;

b) sampling the fluid at one or more selected times during deposition and measuring concentrations of noble metals at each sample time;

d) comparing measured concentrations of noble metals from at least one sample with concentration values computed by the computer model;

e) calibrating the computer model by altering values of reaction rate constants used by the computer model until the model results agree with the sampled concentrations; and f) altering temperature conditions and/or noble metal concentrations in the fluid if subsequent loading rates determined by the computer model are inconsistent with predetermined deposition goals.

* * * * *